Nov. 15, 1927.  
S. L. KELLY  
1,649,033
ELECTRIC HEAT ELEMENT
Filed May 28, 1926
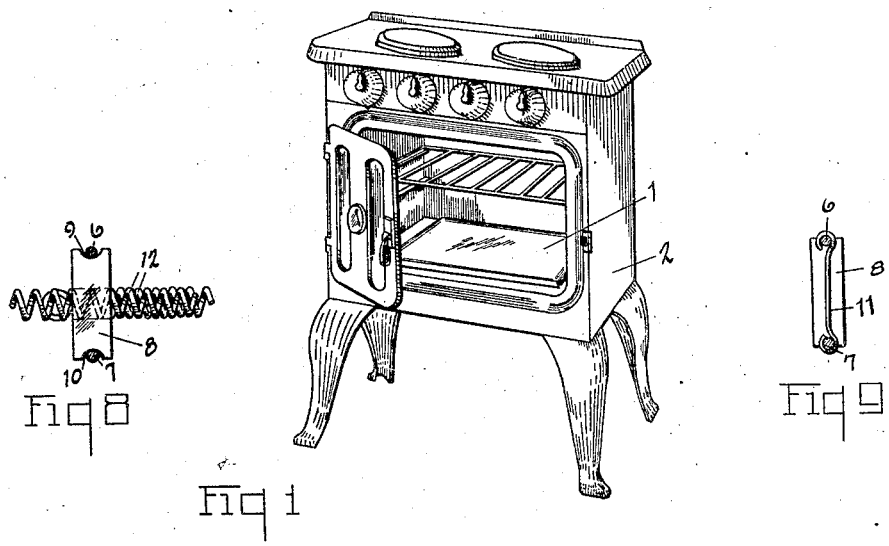
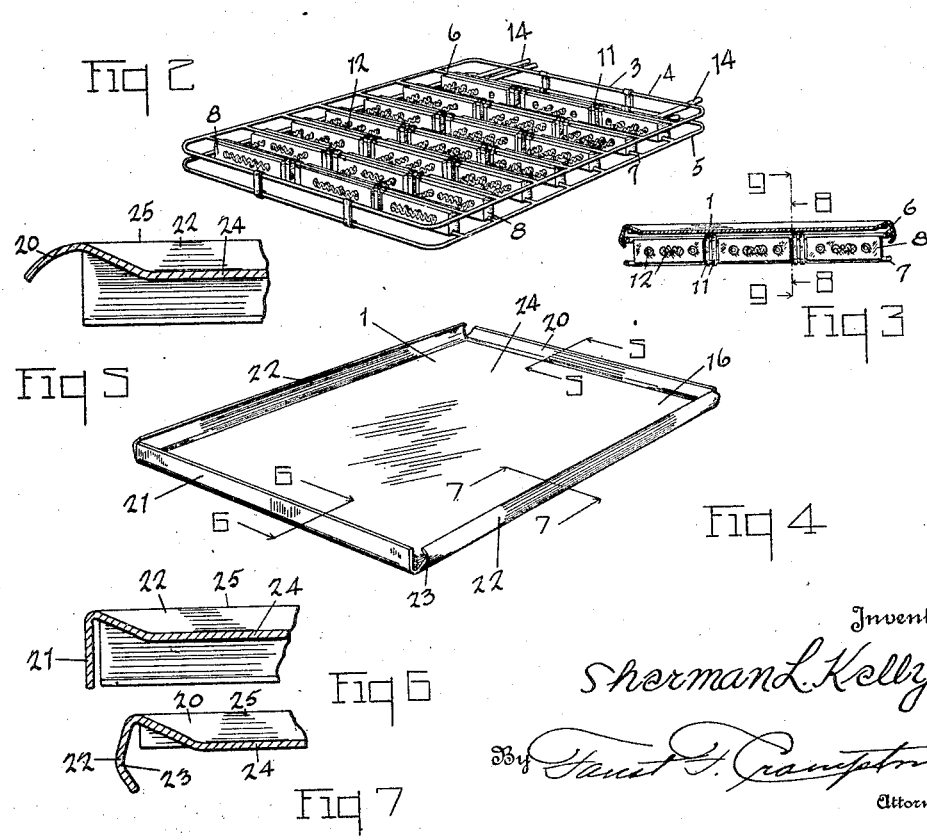
Inventor  
Sherman L. Kelly  
By  
Attorney Patented Nov. 15, 1927.

1,649,033

UNITED STATES PATENT OFFICE.

SHERMAN L. KELLY, OF TOLEDO, OHIO.

ELECTRIC HEAT ELEMENT.

Application filed May 28, 1926. Serial No. 112,199.

My invention has for its object to provide an electrical heat element which is constructed so that it may be readily inserted in an oven or chamber of a cooker or other heater so as to form the bottom or side wall of the chamber. Preferably it is used to form the bottom wall for supporting pots or pans or other containers of material that is to be heated or heat treated. Embodiments of the invention are integral in form and consequently may be used as separate units in any form of device or may be used apart from all devices for heating purposes.

Structures containing my invention are provided with a cover plate that is preferably so formed that it may be removably secured to the element. Also the plate is so constructed that it will deliver mobile materials such as liquids etc., away from the supporting frame and the resistance elements when the plate is located in substantially a horizontal plane. This prevents water and greases from clogging the frame and interfering with the resistance elements.

The invention may be contained in electrical heat elements of different forms for cooking and heating purposes and to illustrate a practical application of the invention I have selected an electrical heating element containing the invention as an example and shall describe it hereinafter. The structure selected is shown in the accompanying drawing.

Figure 1 of the drawing is a perspective view of an electric stove showing the heat element in position, substantially covering the bottom of the oven or cooking chamber. Fig. 2 is a perspective view of the heating element when the cover has been removed. Fig. 3 is a view of a transverse section of the heating element when the cover is in position. Fig. 4 is a perspective view of the cover when inverted. Fig. 5 is a view of a section taken on the plane of the line 5—5 indicated in Fig. 4. Fig. 6 is a view of a section taken on the plane of the line 6—6 indicated in Fig. 4. Fig. 7 is a view of a section taken on the plane of the line 7—7 indicated in Fig. 4. Figs. 8 and 9 show views of sections taken in opposite directions on the plane of the line 8—8, 9—9 indicated in Fig. 3.

The electrical heat element shown in the drawing may be used as a side wall or a bottom wall of a chamber in which articles may be placed that are to be heat treated. If desired, the electric heating element may be placed on a suitable table that is protected against the downward radiation of the resistance elements. The electrical heating element being integral in form may consequently be used for a great variety of purposes. In the drawing it is shown as being used as the heat element of an electric stove. The heat element 1 is located preferably in the bottom of the stove 2. It may, however, be located parallel to one of the sides of the stove and consequently it may be used to form the bottom wall or one of the side walls of the oven of the stove.

The heating element has a supporting frame 3 that is formed of a plurality of wires having sufficient stiffness to quite rigidly maintain the form of the frame. The wires are preferably spot welded together or otherwise secured and they cooperate to maintain the rigidity of the frame. The frame comprises a pair of edge wires 4 and 5. Parallel wires 6 extend between the sides of the edge wire 4 and parallel wires 7 extend between the sides of the edge wire 5. When the frame is assembled the wires 6 are located above the wires 7. A plurality of insulating blocks 8 are located between the wires 6 and 7. The blocks 8 have channels 9 and 10 that are located in their upper and lower surfaces and are so shaped as to receive the wires 6 and 7. The wires 6 and 7 are tied together by means of suitable clips, such as, the wires 11 which are located at the inner ends of the insulating blocks 8. This completes the frame and securely binds the parts together. Resistance wires 12 are threaded through openings that are formed in the blocks 8. A plurality of wires 12 are preferably used in order to obtain a variable heating capacity since one or more of the resistance wires may be connected in an electric circuit. Lead wires 14 suitably insulated may be connected to a suitable switch and to a source of supply of an electric current.

The heater thus formed, because of its integral character, may be installed in devices of different forms for heating them. If desired the heater may be covered by a cover plate 16 that is preferably removably connected to the frame 3 for covering the resistance wires or elements 12 and so that the plate may be readily removed for cleaning. This is of particular advantage where containers of different forms containing material to be heated or heat treated are placed on or above the cover plate 16, since such materials may be spilled over on to the cover plate or may, by reason of the heat, boil over, or otherwise, and portions thereof be deposited on the cover plate. The cover plate 16 is also preferably so constructed that its edges extend downward on each side of the frame so as to deliver materials, that may overflow or spill over on to the cover plate, away from the frame and the resistance element or elements and yet so that the cover plate may slidably engage the frame to secure the cover plate in position. The cover plate 16 has an end edge 20 as shown particularly in Fig. 5 that curves upward and over the edge of the frame and slightly downward but not so far downward as to interfere with the sliding movement of the cover plate with respect to the frame. The end having the edge 20 is thus adapted to receive the upper edge wire 4 of the frame 3. The other end of the cover plate 16 is provided with a downwardly extending edge 21. The cover plate is so formed as to extend upward and then downward at this end as shown more clearly in Fig. 6. The edge portion 21 extends downward sufficiently to engage the other end of the edge wire 4 of the frame 3. The edge 21 thus constitutes a stop when the cover plate and the frame are slid, one relative to the other, into position. The edge portion also operates to deliver mobile materials from the frame in case of overflow or spilling. The side edges 22 of the cover plate also extend upwardly from the body portion of the cover plate and downwardly and then inwardly so as to form a shallow channel 23 for engaging the sides of the edge wire 4 whereby the end of the frame 3 and, particularly, of the edge wire 4 may be inserted under the overhanging edge portion 20 and placed within the shallow channel 23 formed by the edge portions 22 and slid along the cover plate until it is brought to a stop by the end of the frame engaging the downwardly extending edge portion 21 of the cover plate. Thus the cover plate may be readily removed and securely placed in position with reference to the frame of the heat element. Also by reason of the formation of the edge portions of the cover plate, a shallow pan is formed in the body portion of the plate 16 since the body portion 24 is located below the uppermost portions 25 of the edges 21 and 22. This enables the cover plate to retain a material amount of mobile substance that may be deposited thereon and is also of such a form that it may be readily cleansed.

Inasmuch as the edges of the cover plate are well above the bottom of the heater air circulation will be produced which by convection will heat the chamber and containers in addition to the heat transmitted by radiation and conduction. Heating by convection will be increased if the heat element is used to form one or a part of one of the walls of the chamber in which it is located since the rate of circulation will be increased.

I claim:

1. In a cover plate for heaters, the heater having a frame, the frame having an upper edge wire, the cover plate having side edges extending downward for delivering mobile material deposited on the plate away from the frame, two of the downwardly extending side edge portions of the plate curved inward to slide along and engage the sides of the edge wire frame.

2. In a cover plate for heaters, a frame having an edge wire, the cover plate having side edges extending downward for delivering mobile material deposited on the plate away from the frame, two of the side edge portions curved to engage and slide along the sides of the edge wire frame and for supporting the upper side corners of the plate in spaced relation to the edge wire, one of the downwardly extending edge portions of the plate being inclined outward to permit the said last named edge portion of the plate to be moved across the frame, the other end edge portion of the plate extending below the plane of the edge wire.

In testimony whereof I have hereunto signed my name to this specification.

SHERMAN L. KELLY.